Feb. 27, 1962     C. J. MORATIS ET AL     3,023,390
APPLYING ELECTRODES TO CERAMIC MEMBERS
Filed March 17, 1960

WITNESSES

INVENTORS
Christy J. Moratis, Yoshio Ichikawa
and Edward A. Pigan
BY
ATTORNEY 3,023,390
APPLYING ELECTRODES TO CERAMIC MEMBERS
Christy J. Moratis, Penn Hills, Yoshio Ichikawa, Wilkins Township, Allegheny County, and Edward A. Pigan, Monroeville, Pa., assignors to Westinghouse Electric Corporation, East Pittsburgh, Pa., a corporation of Pennsylvania
Filed Mar. 17, 1960, Ser. No. 15,599
6 Claims. (Cl. 338—309)

This invention relates to ceramic bodies, and particularly to thermistors, having a flame sprayed, low electrical resistance metallic surface coating thereon forming an electrode structure, and a process for preparing the same.

The majority of present day methods employed to produce contact electrodes on thermistors and other devices have a high contact resistance, poor bond strength, or other undesirable characteristics. Consistently reliable contact electrodes are difficult to produce. Both high bond strength and low electrical contact resistance are necessary to attain desirable electrical and mechanical properties required of a thermistor device, as well as other devices embodying ferrites and other ceramic materials.

In thermistors the resistance-temperature properties require that there be a dependable low contact resistance electrode so that the intrinsic properties of the thermistor be employed satisfactorily. The functions of both positive temperature coefficient (PTC) and negative temperature coefficient thermistor devices may be seriously impaired if poor electrodes are applied thereto. Variable high resistance, much less open circuits, will render these devices substantially useless.

For successful operation, the resistance-temperature response of the thermistor must be unaffected by repetitive temperature fluctuations. It is highly desirable that the room temperature resistance parameters do not vary more than +10% or −20% after repeatedly thermally cycling the thermistor device over normally expected service temperature ranges. The contact resistance between the metallic coating and thermistor material must also be of a low value so that self-heating will be minimized and that the desirable electrical properties of the thermistor device can be fully utilized.

An object of the present invention is to provide a body of electrically conducting ceramic material and a consistently reliable contact thereon comprising an intimately bonded flame sprayed metallic coating applied to at least one surface thereof, the coating comprising predetermined proportions of silver, cadmium, zinc and copper, whereby the contact between the ceramic body and the metallic coating has a low electrical resistance.

It is another object of the invention to provide a thermistor device comprising a body of electrically conductive ceramic material comprising a stoichiometric combination of a mixture of titanium dioxide and zirconium dioxide, and either barium oxide, barium strontium oxide or barium lead oxide, with small amounts of rare earth metal oxides; and an intimately bonded flame sprayed thin metallic coating applied to opposite surfaces thereof, said coating comprising predetermined proportions of silver, cadmium, zinc and copper; and soldered to the coating a body of electrode material having lugs to be crimped about conductors.

It is still another object of the invention to provide a process for coating a shaped body of thermistor material with a powdered alloy comprising predetermined proportions of silver, cadmium, zinc and copper comprising projecting particles of the powder in a high temperature flame at a high velocity upon the faces of the body, so that upon impact with the faces a closely adherent layer of metal is produced.

Other objects of the invention will, in part, be obvious and will, in part, appear hereinafter.

For a better understanding of the nature and scope of the invention, reference should be had to the following, in which.

In accordance with the present invention and in attainment of the foregoing objects, there is provided (1) a sintered body of electrically conductive ceramic material and particularly a thermistor material comprising a stoichiometric combination of a mixture of titanium dioxide and zirconium dioxide, and either barium oxide, or barium strontium oxide, or barium lead oxide, with controlled small amounts of rare earth metal oxides such as yttrium and cerium, and (2) an electrical contact means comprising an intimately bonded, flame sprayed metallic coating of an alloy of silver, cadmium, zinc and copper applied to at least one surface thereof. In addition, there may be provided, (3) a body of an electrode metal and (4) a specific solder bonding the body of electrode metal to the flame sprayed coating. The flame sprayed coating may preferably comprise by weight, from 40% to 55% silver, from 20% to 30% cadmium, from 10% to 20% zinc, and from 10% to 20% copper. The flame sprayed contact between the ceramic body and the metallic coating has a low electrical resistance, and is extremely adherently bonded thereto so that during subsequent soldering and during service it will not detach or otherwise fail.

Figure 1:
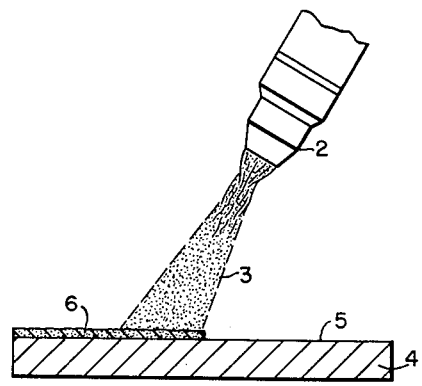
FIGURE 1 is a cross-sectional view in elevation illustrating the method of providing a flame sprayed metallic coating of the invention.

Referring to FIG. 1, there is illustrated a flame spraying operation employing a flame spraying projector 2 by means of which a powder alloy 3 previously described, is projected in a combustible gas mixture flame, such as oxy-acetylene, at a high velocity upon a face 5 of a body 4 of electrically conductive ceramic material. The body 4 is shown as a flat wafer, but it may be a pellet or rod or of other shape. It is desirable that the average particle size of the metallic powder fed to the projector 2 ranges in fineness from 80 to 250 mesh. It is not desirable to have a great proportion of particles much coarser than 60 mesh, nor finer than 320 mesh. It will be appreciated that in any powder mixture there will be some extremely fine particles. During spraying, the flame at least partially melts the surfaces of the particles so that upon impact with the face 5 of the body a closely adherent layer 6 of metal is deposited thereon.

Figure 2:
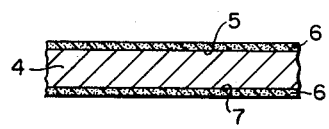
FIG. 2 is a cross-sectional view of a ceramic body containing a flame sprayed metallic coating in accordance with the invention.

As illustrated in FIG. 2, the ceramic body 4 is provided with flame spray coating 6 on both faces 5 and 7. Due to the fact that the flame spraying drives the metallic particles into the ceramic material, the actual bond surface therebetween is relatively rough. The thickness of each of the coatings 6 is of the order of a few mils. Good results have been obtained when a coating of an average thickness of from 1.5 to 3 mils was applied. Coatings may be somewhat thicker than this, though usually relatively thin coatings, for instance from 1 to 5 mils are preferred.

Figure 3:
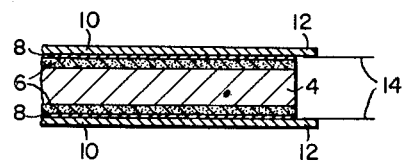
FIG. 3 is a cross-sectional view of the thermistor device in accordance with the invention.

Referring to FIG. 3, there is shown a complete electrode or contact structure on the ceramic body 4. A layer of a bonding solder 8 is applied to each of the flame sprayed coatings 6 and plates of a metallic electrode 10 are soldered thereby to each of the flame sprayed coatings. The electrodes 10 comprise projecting lugs 12 for affixing electrical leads 14 thereto. The lugs 12 can be so formed with crimpable ears so that the lead 14 can be crimped in place.

Also a solder can be employed to connect leads 14 to lugs 12.

The electrode plates 10 are produced by cutting or punching them from a flat sheet of a stainless steel alloy. A suitable alloy comprises by weight, about, 42% nickel, 6% chromium and 52% iron. However, a plate such as 10 is not indispensably necessary though it is beneficial. Suitable solder compositions for solder 8 are alloys melting at about 240° C. and higher. Such solders will preferably contain small amounts of up to 15% of indium, the balance being lead, silver, tin, copper and zinc. A suitable solder 8 may comprise by weight, 5% indium, 2% silver and 93% lead.

The following example is illustrative of the present invention.

A shaped sintered body of thermistor material comprising the following formula was prepared:

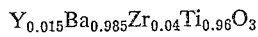
$$Y_{0.015}Ba_{0.985}Zr_{0.04}Ti_{0.96}O_3$$

the sintered body was of flat ended circular cylindrical shape, which measured 0.372 inch in diameter and 0.053 inch in thickness. The body was flame sprayed with spraying apparatus using a powdered alloy having an average particle size of 250 mesh. Its composition was 45% silver, 24% cadmium, 16% zinc, and 15% copper. The total spraying time required to coat both flat ends of 20 of these thermistor bodies, prepared by identical means, was approximately one minute. The coatings had an average thickness of from 1.5 to 3 mils. After the flame sprayed coatings were applied, lugged metal electrodes of a thickness of 25 mils of a composition of 42% by weight nickel, 6% chromium, and 52% by weight iron were then soldered to the flame sprayed ends. The solder comprised 5% by weight indium, 2% by weight silver and 93% by weight lead. Thereafter wire leads were attached to the metal electrodes by crimping at the lugs. Upon testing the resulting thermistor devices, it was found that the resistance of the entire group averaged closely to 50 ohms, which is essentially the resistance of the thermistor material itself. This is a desirable room temperature resistance value for these thermistors. The bond strength of the complete electrodes was excellent. Upon cycling from 70° C. to 125° C. for 17,124 cycles some 40 units there was substantially no change for 85% of the units, while all the rest increased only 10% in resistivity. This is indicative of the unusual stability and low ohmic resistance of the contacts applied to the devices of the present invention.

While the example is specific to applying flame sprayed metallic coatings to the particular thermistor composition described herein, it should be understood that said flame sprayed coatings may be applied with equal success to any thermistor composition of the positive temperature coefficient type disclosed in copending applications Serial Number 717,191, filed February 24, 1958, Serial No. 862,248, filed December 24, 1959, now Patent No. 2,981,699. The same surface coatings may also be flame sprayed on negative temperature coefficient thermistors, on members composed of ferrites, on thermoelectric members and on various ceramic materials.

It is intended that the accompanying description and drawings will be interpreted as illustrative and not limiting.

We claimed as our invention:

1. A body of electrically conductive ceramic material and an intimately bonded flame sprayed coating applied to at least one surface thereof, said coating comprising by weight from 40 to 55% silver, from 20 to 30% cadmium, from 10 to 20% zinc and from 10 to 20% copper, the flame sprayed coating being adherently bonded whereby the contact between the ceramic body and the metallic coating has a low electrical resistance.

2. A member comprising a body of electrically conductive titanite ceramic material and an intimately bonded flame sprayed metallic coating applied to at least one surface of the body, said coating comprising by weight from 40 to 55% silver, from 20 to 30% cadmium, from 10 to 20% zinc and from 10 to 20% copper, the flame sprayed coating being adherently bonded whereby the contact between the ceramic body and the metallic coating has a low electrical resistance.

3. A body of electrically conductive ceramic material comprising a stoichiometric combination of a mixture of titanium dioxide and zirconium oxide, and one of the group consisting of barium oxide, barium strontium oxide and barium lead oxides and at least one rare earth metal selected from the group consisting of yttrium and cerium and an intimately bonded flame sprayed coating applied to at least one surface thereof, said coating comprising by weight about 40 to 55% silver, from 20 to 30% cadmium, from 10 to 20% zinc and from 10 to 20% copper, the flame sprayed coating being adherently bonded whereby the contact between the ceramic body and the metallic coating has a low electrical resistance.

4. A thermistor device comprising a ceramic material comprising a stoichiometric combination of a mixture of titanium dioxide and zirconium oxide, and one of the group consisting of barium oxide, barium strontium oxide and barium lead oxides with controlled small amounts of rare earth metal oxides and an intimately bonded flame sprayed coating applied to at least one surface thereof, said coating comprising by weight from 40 to 55% silver, from 20 to 30% cadmium, from 10 to 20% zinc and from 10 to 20% copper, the flame sprayed coating being inherently bonded whereby the contact between the ceramic body and the metallic coating has a low electrical resistance.

5. A thermistor device comprising (1) a body of electrically conductive ceramic material comprising a stoichiometric combination of a mixture of titanium dioxide and zirconium oxide, and one of the group consisting of barium oxide, barium strontium oxide and barium lead oxides with controlled small amounts of rare earth metal oxides; (2) an intimately bonded flame sprayed coating applied to opposite surfaces thereof, said coating comprising by weight 40 to 55% silver, from 20 to 30% cadmium, from 10 to 20% zinc and from 10 to 20% copper; and (3) an electrode material comprising by weight, from 42% nickel, 6% chromium, and 52% iron soldered to the coated surfaces of the body of ceramic material containing a cylindrical projecting lug the solder for joining the electrode to the coating comprising by weight 5% indium, 2% silver and 93% lead.

6. A body of electrically conductive ceramic material comprising a stoichiometric combination of a mixture of titanium dioxide and zirconium oxide, and one of the group consisting of barium oxide, barium strontium oxide and barium lead oxides and at least one rare earth metal selected from the group consisting of yttrium and cerium and an intimately bonded flame sprayed coating applied to at least one surface thereof, said flame sprayed coating being adherently bonded whereby the contact between the ceramic body and the metallic coating has a low electrical resistance.

References Cited in the file of this patent

UNITED STATES PATENTS

| | | |
|---|---|---|
| 512,160 | Coles | Jan. 2, 1894 |
| 2,331,444 | Wainer | Oct. 12, 1943 |
| 2,885,310 | Olson et al. | May 5, 1959 |
| 2,901,381 | Teal | Aug. 25, 1959 |
| 2,926,325 | Moore et al. | Feb. 23, 1960 |
| 2,933,710 | Novak et al. | Apr. 19, 1960 |
| 2,976,505 | Ichikawa | Mar. 21, 1961 |